United States Patent
Falcou et al.

(10) Patent No.: US 6,951,988 B2
(45) Date of Patent: Oct. 4, 2005

(54) DEVICE FOR WEIGHING AN OBJECT BY LIFTING WHICH INVALIDATES A WEIGHT MEASUREMENT READING WHENEVER A DETECTED SHEAR FORCE IS TOO GREAT

(75) Inventors: Gérard Falcou, Solies Toucas (FR); Thierry Goder, La Valette Du Var (FR); François Boyer, Toulouse (FR)

(73) Assignee: Airbus France, Toulouse (FR)

( * ) Notice: Subject to any disclaimer, the term of this patent is extended or adjusted under 35 U.S.C. 154(b) by 239 days.

(21) Appl. No.: 10/380,528

(22) PCT Filed: Sep. 25, 2001

(86) PCT No.: PCT/FR01/02960

§ 371 (c)(1),
(2), (4) Date: Mar. 14, 2003

(87) PCT Pub. No.: WO02/27282

PCT Pub. Date: Apr. 4, 2002

(65) Prior Publication Data

US 2004/0031627 A1 Feb. 19, 2004

(30) Foreign Application Priority Data

Sep. 27, 2000 (FR) .......................................... 00 12282

(51) Int. Cl.[7] .............................................. G01G 19/02
(52) U.S. Cl. ........................ 177/141; 177/146; 177/185
(58) Field of Search .......................... 177/25.11–25.13, 177/45–50, 140, 141, 146, 185

(56) References Cited

U.S. PATENT DOCUMENTS

| 2,754,107 | A | | 7/1956 | Ernst et al. ................. 177/211 |
|---|---|---|---|---|
| 2,806,686 | A | | 9/1957 | Miller, Jr. ................... 177/146 |
| 3,589,459 | A | * | 6/1971 | Harvey ....................... 177/141 |
| 4,385,527 | A | | 5/1983 | Raskin .................. 73/862.044 |
| 4,553,619 | A | * | 11/1985 | Fujinaga ..................... 177/185 |
| 4,782,904 | A | * | 11/1988 | Brock ......................... 177/185 |
| 4,858,709 | A | * | 8/1989 | Stahl .......................... 177/164 |
| 4,889,202 | A | * | 12/1989 | Bron .......................... 177/134 |
| 5,220,970 | A | * | 6/1993 | Bachmann .................. 177/178 |
| 6,002,090 | A | | 12/1999 | Johnson et al. ............. 177/136 |
| 6,598,010 | B2 | * | 7/2003 | Zefira ......................... 702/173 |
| 6,689,960 | B2 | * | 2/2004 | Aoki ....................... 177/25.13 |

* cited by examiner

*Primary Examiner*—Randy W. Gibson
(74) *Attorney, Agent, or Firm*—Stevens, Davis, Miller & Mosher, LLP

(57) ABSTRACT

The invention concerns a device comprising an electronic sensor (6) designed to deliver a compression signal and a shearing signal, and a comparator for comparing the shearing signal to a threshold value, so as to validate, or invalidate, the compression signal. The invention is useful for weighing aircraft.

6 Claims, 2 Drawing Sheets

DEVICE FOR WEIGHING AN OBJECT BY LIFTING WHICH INVALIDATES A WEIGHT MEASUREMENT READING WHENEVER A DETECTED SHEAR FORCE IS TOO GREAT

BACKGROUND OF THE INVENTION

The present invention relates to a device for weighing an object by lifting it. It applies to the weighing of all kinds of objects, particularly heavy and bulky ones. However, it will be explained hereinafter in the more particular context of the weighing of aircraft.

It is known that, in order to weigh an aircraft, weighing devices each provided with an electronic compression sensor, for example arranged at the end of a ram or similar lifting appliance can be arranged under each of the wheelsets, and said airplane is lifted by action of said rams, said sensors being pressed between the corresponding ram and the corresponding wheelset. As a result, the measurement of the compressive load, which measurement is delivered by a sensor, is representative of the mass of that part of the aircraft which has been raised by the corresponding ram.

However, such a weighing can be representative of the true mass of the aircraft only if no parasitic transverse force, for example due to deformation of the aircraft, enters into the lifting operation during weighing. Hence, in order to be sure of obtaining a sufficiently precise measurement of the mass of an aircraft, the latter has to be transported to a special weighing site equipped with a fixed-station weighing system.

Of course such sites are expensive, and the business of weighing an aircraft is a lengthy one because said aircraft has to be taken to the special weighing site then taken away again.

It is an object of the present invention to overcome this drawback. The invention relates to a device allowing an aircraft to be weighed in situ without having to move it.

SUMMARY OF THE INVENTION

To this end, according to the invention, the device for weighing an object by lifting, comprising:
 a base;
 a slide mounted so that it can move vertically on said base;
 drive means for moving said slide with respect to said base;
 an electronic sensor, secured to said slide in terms of vertical movement and arranged on said slide in such a way as to be inserted between the latter and said object when said drive means operate said slide in order to lift said object, said sensor delivering a first measurement signal representative of the compressive load to which it is subjected; and
 means for reading said first measurement signal, is notable:
 in that said electronic sensor is able, in a way known per se, in addition to deliver a second measurement signal representative of the shear load, transverse to said object, to which it is subjected; and
 in that said device comprises comparison means for comparing said second measurement signal with a threshold value so as to validate, or invalidate, said first measurement signal.

It can thus be seen that, by virtue of the present invention, said first measurement signal (that is to say the measurement of the mass of the aircraft in the example above) is validated only if the second measurement signal (that is to say the parasitic transverse force) is below said threshold.

Of course, the value of said threshold is chosen so that, when it validates said first signal, the value of the latter corresponds to the mass of said object with sufficient precision and so that, when it does not validate said first signal, the value of said first signal is not representative of said mass with sufficient precision.

Said threshold value may be predetermined and correspond to a value of said second measurement signal above which said first measurement signal is no longer representative of the true mass of said object.

As an alternative, said threshold value may correspond to a predetermined fraction of said first measurement signal above which the latter is no longer representative fo the true mass of said object.

Furthermore, to allow said sensor to center itself spontaneously under said object and limit the parasitic transverse shear loadings, said sensor is mounted on said slide in such a way as to be able, within certain limits, to slide freely in a horizontal direction transversal to said object.

As a preference, so as to be able to be moved around and placed under said object with ease, the weighing device according to the present invention is mounted on a mobile carriage. Such a mobile carriage can be moved around in the manner of garage jacks used to jack up automobiles. As an alternative, it may be motorized.

The figures of the appended drawing will make it easy to understand how the invention may be embodied. In these figures, identical references denote similar elements.

DETAILED DESCRIPTION OF THE INVENTION

Figure 1:
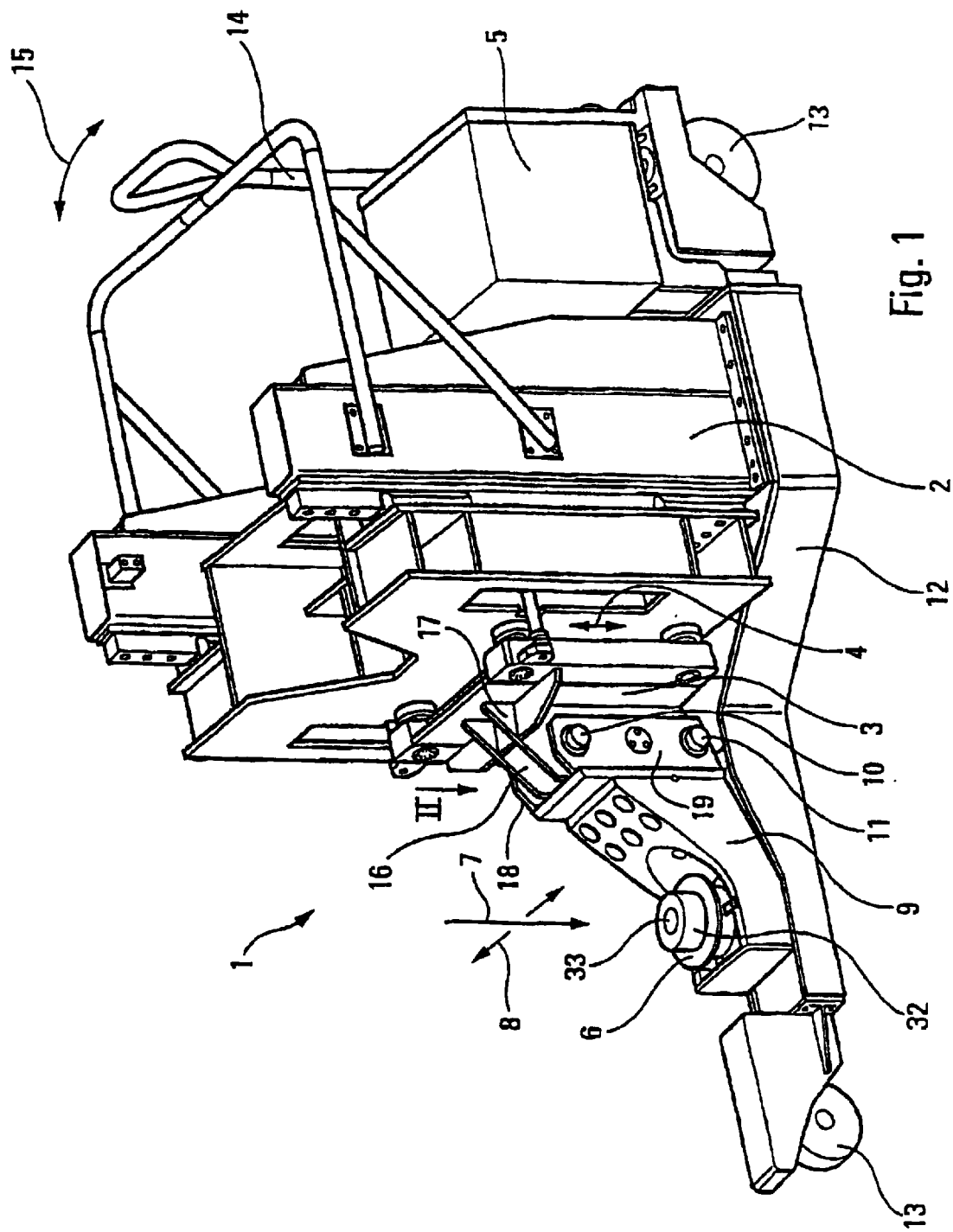
FIG. 1 shows, in perspective from above and the front, one practical embodiment of the weighing device according to the present invention.

Device 1 for weighing by lifting, depicted in perspective in FIG. 1, comprises a base 2, a slide 3 mounted so that it can move vertically on the base 2, as symbolized by the double-headed arrow 4, and an electric or hydraulic motor 5 allowing the slide 3 to be moved with respect to the base 2. The device 1 additionally comprises an electronic sensor 6 able to deliver, on the one hand, a signal measuring compression, when subjected to a compressive loading (symbolized by the arrow 7) and, on the other hand, a signal measuring transverse shear (symbolized by the arrow 8). The electronic sensor 6 is borne by a support 9 connected to said slide 3 by two horizontal pins 10 and 11 parallel to said transverse shear loading 8.

The collection of elements 2, 3, 5, 6, 9, 10 and 11 is borne by a carriage 12 provided with wheels 13 and with a pivoting lever 14 (arrow 15) allowing said carriage 12 to be guided in the customary way as it moves and allowing the wheels 13 to be prevented from turning when stationary.

Figure 2:
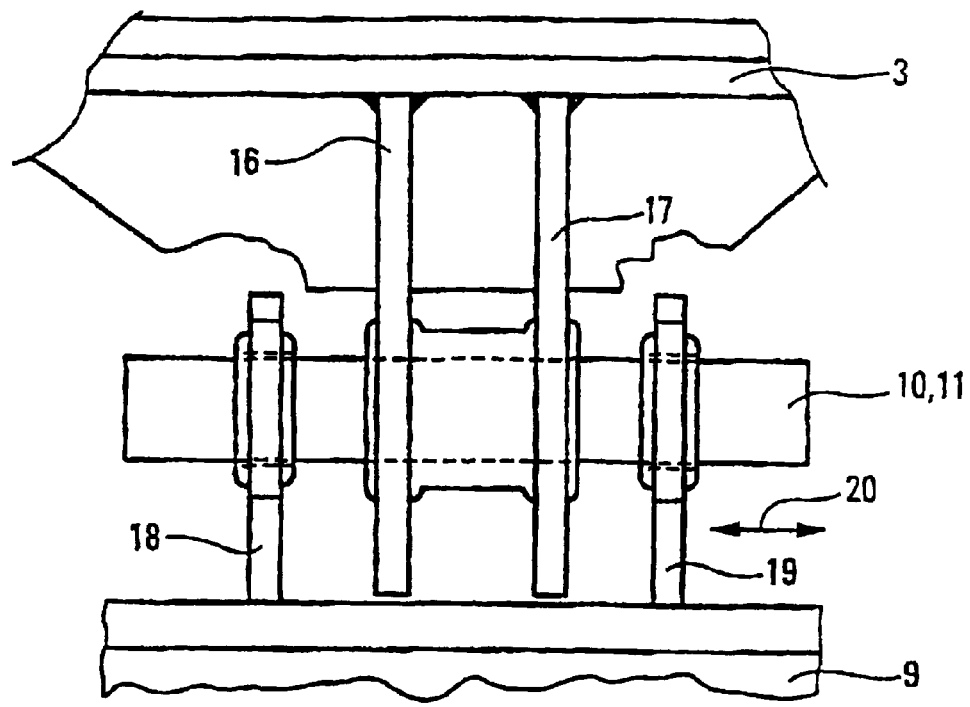
FIG. 2 is a part view from above of this weighing device, in the direction of arrow II of FIG. 1.

As can be seen in greater detail in the partial plan view of FIG. 2, the slide 3 comprises two parallel vertical walls 16 and 17 projecting toward the support 9. Likewise, the latter has two vertical walls 18 and 19 which are mutually parallel and parallel to the walls 16 and 17, projecting toward the slide 3. In the embodiment depicted in FIG. 2, the walls 18 and 19 are arranged on each side of the walls 16 and 17.

Each of the two pins 10 and 11 passes through the four walls 16 to 19 and said pins are mounted with respect to said walls in such a way that the support 3 can slide freely parallel to said pins 10 and 11, with respect to the slide 3, as symbolized in FIG. 2 by the double-headed arrow 20. Of course, the sliding travel is limited by the collaboration of walls 16 and 18, on the one hand, and by the collaboration of the walls 17 and 19, on the other.

Figure 3:
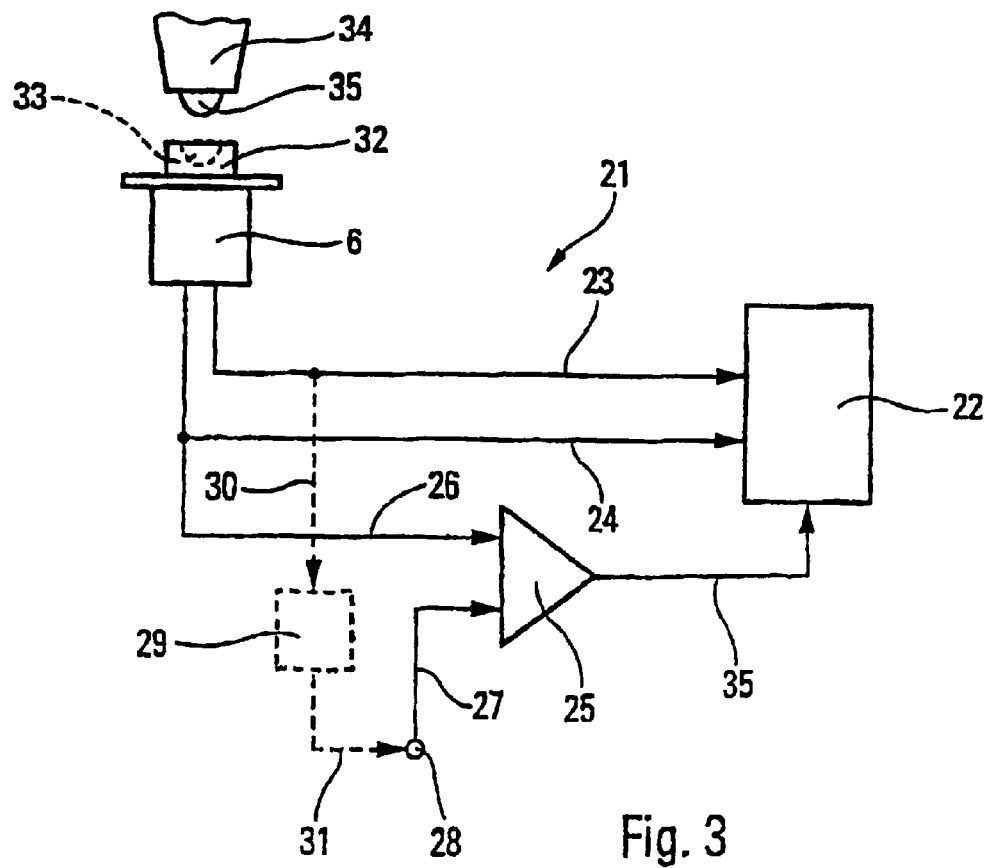
FIG. 3 is the block diagram of the electrical measuring circuit of the device according to the present invention.

As is shown in FIG. 3, the weighing device 1 comprises a measurement circuit 21, not visible in FIG. 1. This measurement circuit 21 comprises a reading and display device 22 receiving, via a link 23, the compressing measurement signal generated by the electronic sensor 6. The shear measurement signal, also generated by the electronic sensor 6, may also be sent to the reading and display device 22 as appropriate, via a link 24.

The measurement circuit 21 additionally comprises a comparator 25 receiving, on one of its two inputs, via a link 26, said shear measurement signal generated by the electronic sensor 6 and, on its other input, via a link 27, a threshold value available at a terminal 28.

This threshold value may be predetermined and applied to the terminal 28 by a generator (not depicted). As an alternative, this threshold value may be generated by a divider 29 receiving, via a link 30, the compression measurement signal and sending a fraction of said signal to said terminal 28 via a link 31.

Furthermore, the electronic sensor 6 bears, on its sensitive upper face, a centering block 32 provided with a centering cavity 33.

The way in which the weighing device according to the present invention works is as follows.

An operator brings the carriage 12 under the object for weighing (for example an airplane, not depicted) so that said centering block 32 lies approximately facing a centering block 34, provided especially for this purpose under said object and provided with a centering projection 35 that complements the centering cavity 33 of said centering block 32.

The operator then operates the motor 5 and the slide 3 rises, moving the sensor 6 nearer to the object for weighing. AS the slide 3 continues to rise, the cavity 33 of the centering block 32 collaborates with the projection 35 of the centering block 34 to improve the transverse centering of the sensor 6 with respect to the object for weighing so that said sensor 6 is able to move in a limited way (arrow 20) by virtue of the slide pins 10 and 11.

The rising of the slide 3 is halted when, through collaboration between the blocks 32 and 34, the object for weighing has been lifted by said slide 3.

The compressive measurement signal (the weight) and possibly the shear measurement signal (the transverse loading) are sent to the read and display device 22 via the links 23 and 24 respectively.

In addition, via a link 35, the comparator 25 sends the read and display device 22 the result of the comparison between said shear measurement signal and the threshold value present on the terminal 28.

As a result, if the transverse loadings 8 are low enough not to adversely affect the precision of the weight (a fact which is represented by said threshold value), said weight is displayed on the device 22.

By contrast, if the transverse loadings 8 are too high and are adversely affecting the precision of the weight, the comparison signal carried by the link 35 inhibits the displaying of said weight or indicates that this weight is not reliable.

Of course, to weigh an object as heavy and bulky as an airplane, use may be made of several weighing devices 1, preferably each arranged under one wheelset and synchronized with the others in terms of operation.

Although an embodiment comprising a carriage 12 that can be moved around in the manner of a garage jack used for jacking up automobiles has been described hereinabove, it goes without saying that said mobile carriage could be motorized using any known motorizing means, for example a battery-powered electric motor.

What is claimed is:

1. A device for weighing an object by lifting, comprising:
   a base (2);
   a slide (3) mounted so that it can move vertically on said base (2);
   drive means (5) for moving said slide (3) with respect to said base (2);
   an electronic sensor (6), secured to said slide (3) in terms of vertical movement and arranged on said slide (3) in such a way as to be inserted between the latter and said object when said drive means (5) operate said slide in order to lift said object, said sensor (6) delivering a first measurement signal representative of the compressive load to which it is subjected; and
   means (22) for reading said first measurement signal, characterized:
   in that said electronic sensor (6) is able, in a way known per se, in addition to deliver a second measurement signal representative of the shear load, transverse to said object, to which it is subjected; and
   in that said device comprises comparison means (25) for comparing said second measurement signal with a threshold value so as to validate, or invalidate, said first measurement signal.

2. The weighing device as claimed in claim 1, characterized in that said threshold value is predetermined and corresponds to a value of said second measurement signal above which said first measurement signal is no longer representative of the true mass of said object.

3. The weighing device as claimed in claim 1, characterized in that said threshold value is a predetermined fraction of said first measurement signal above which the latter is no longer representative of the true mass of said object.

4. The weighing device as claimed in claim 1, characterized in that said sensor (6) is mounted on said slide (3) in such a way as to be able, within certain limits, to slide freely in a horizontal direction transverse to said device.

5. The weighing device as claimed in claim 1, characterized in that it is mounted on a mobile carriage (12).

6. The weighing device as claimed in claim 5, characterized in that said mobile carriage (12) is motorized.

* * * * *